United States Patent [19]
Adams

[11] Patent Number: 5,163,262
[45] Date of Patent: Nov. 17, 1992

[54] COLLAPSIBLE STRUCTURE

[75] Inventor: Louis R. Adams, Ojai, Calif.

[73] Assignee: Astro Aerospace Corporation, Carpinteria, Calif.

[21] Appl. No.: 484,490

[22] Filed: Feb. 26, 1990

Related U.S. Application Data

[63] Continuation of Ser. No. 42,162, Apr. 23, 1987, abandoned.

[51] Int. Cl.$^5$ .............................................. E04H 12/18
[52] U.S. Cl. ........................................ 52/646; 52/645; 52/111; 52/632
[58] Field of Search .................. 52/108, 109, 111, 632, 52/645, 646; 135/103, 104; 182/152

[56] References Cited

U.S. PATENT DOCUMENTS

| | | |
|---|---|---|
| 415,667 | 11/1889 | Edwards . |
| 2,301,077 | 11/1942 | Payton . |
| 3,053,351 | 9/1962 | Fulcher . |
| 3,486,279 | 12/1969 | Webb ................................... 52/108 |
| 3,521,421 | 7/1970 | Schroeder, Jr. . |
| 3,751,863 | 8/1973 | Lyons . |
| 3,757,476 | 9/1973 | Schoen . |
| 3,783,573 | 1/1974 | Vaughan ............................. 52/646 |
| 3,830,031 | 8/1974 | Soisson . |
| 4,115,975 | 9/1978 | Bliss . |
| 4,276,726 | 7/1981 | Derus .................................. 52/109 |
| 4,332,501 | 6/1982 | Slysh . |
| 4,334,391 | 6/1982 | Hedgepeth et al. . |
| 4,480,415 | 11/1984 | Truss ................................. 52/108 |
| 4,482,900 | 11/1984 | Bilek et al. . |
| 4,524,552 | 6/1985 | Hujsak . |
| 4,532,742 | 8/1985 | Miura . |
| 4,539,786 | 9/1985 | Nelson . |
| 4,557,097 | 12/1985 | Mikulas, Jr. et al. ................ 52/646 |
| 4,569,176 | 2/1986 | Hedgepeth et al. .................. 52/645 |
| 4,599,832 | 7/1986 | Benton et al. . |
| 4,655,022 | 4/1987 | Natori ................................ 52/646 |
| 4,667,451 | 5/1987 | Onoda ............................... 52/646 |
| 4,677,803 | 7/1987 | Mikulas, Jr. et al. ................ 52/646 |
| 4,679,961 | 7/1987 | Stewart ........................... 52/646 X |
| 4,771,585 | 9/1988 | Onoda et al. ..................... 52/511 X |
| 4,819,399 | 4/1989 | Onoda ............................. 52/645 X |
| 4,866,892 | 9/1989 | Satoh et al. . |
| 5,016,418 | 5/1991 | Rhodes et al. ....................... 52/646 |
| 5,094,046 | 3/1992 | Prelswerk ........................... 52/108 |

FOREIGN PATENT DOCUMENTS 2487133  1/1982  France .

OTHER PUBLICATIONS

Radio Towers Crank Up To The Sky, Popular Mechanics—Jan. 1956, 148–149.

Primary Examiner—David A. Scherbel
Assistant Examiner—Robert Canfield
Attorney, Agent, or Firm—Spensley Horn Jubas & Lubitz

[57] ABSTRACT

A truss structure, which is movable between a collapsed position and a deployed position, has at least one frame section. The frame section has a number of frame units, wherein each frame unit includes three elongated members forming a triangle independent of the triangle formed by the other frame units. A first elongated member of each frame unit is coupled to a first elongated member of another frame unit such that these coupled first elongated members form a polygon. The remaining elongated members of each frame unit are pivotally connected to the first elongated member of their respective frame unit so as to be pivoted with respect to the first elongated member during movement of the truss structure between the collapsed and deployed positions. A number of foldable batten members are connected at their ends to the frame units to form a second polygon. The foldable batten members fold, approximately at their midpoints, during movement of the truss structure between the collapsed and deployed positions.

17 Claims, 4 Drawing Sheets

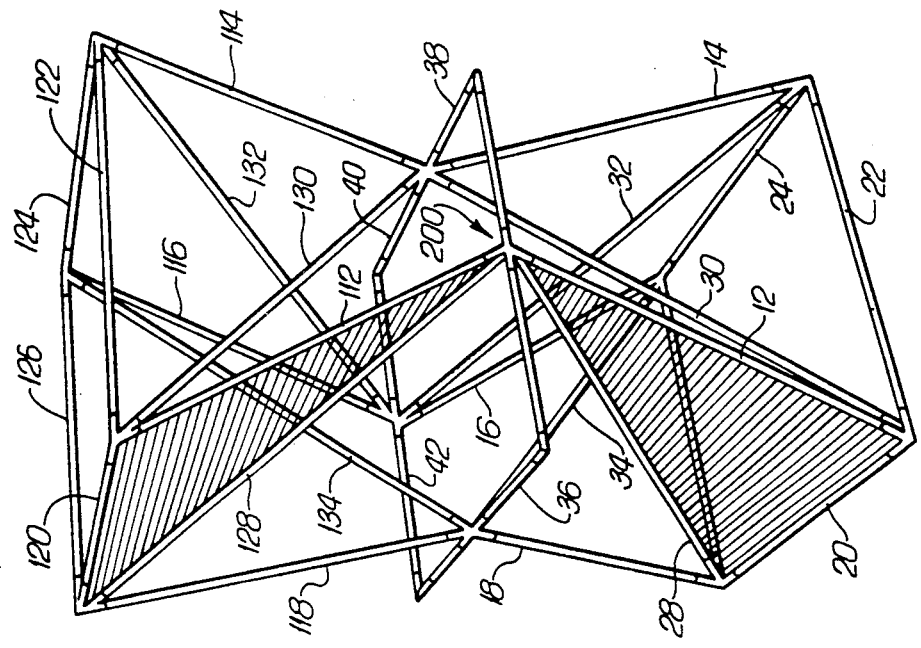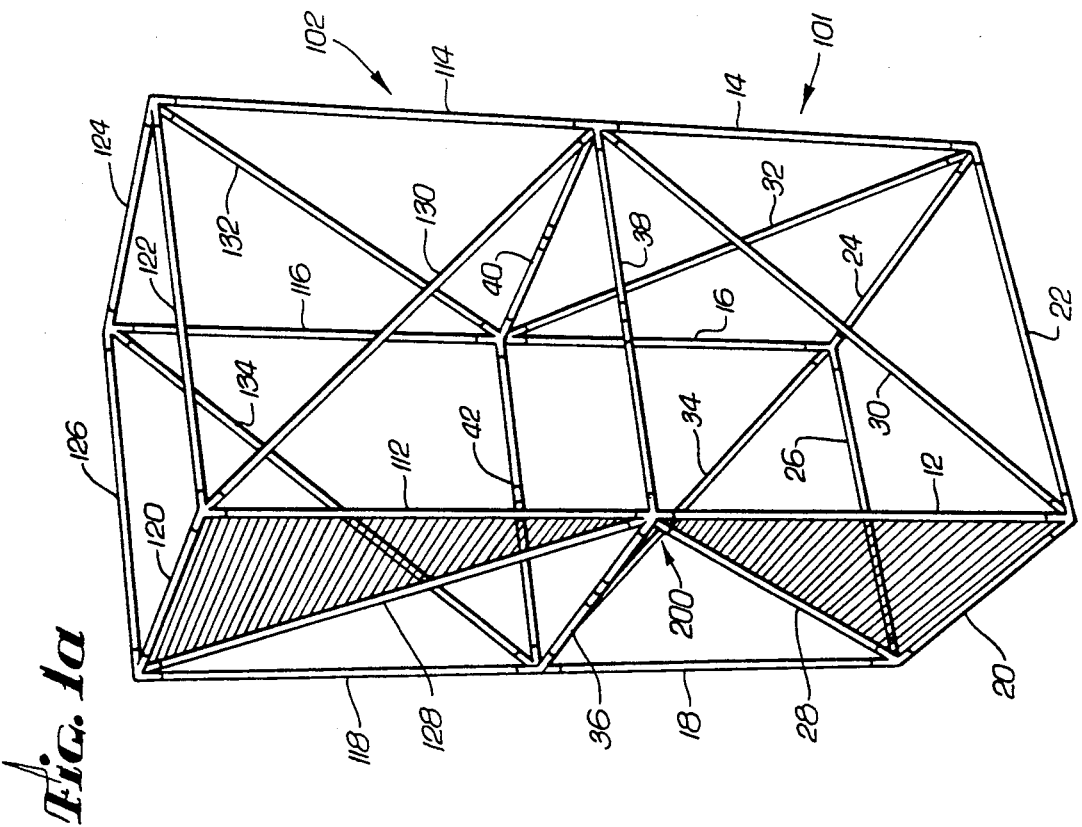

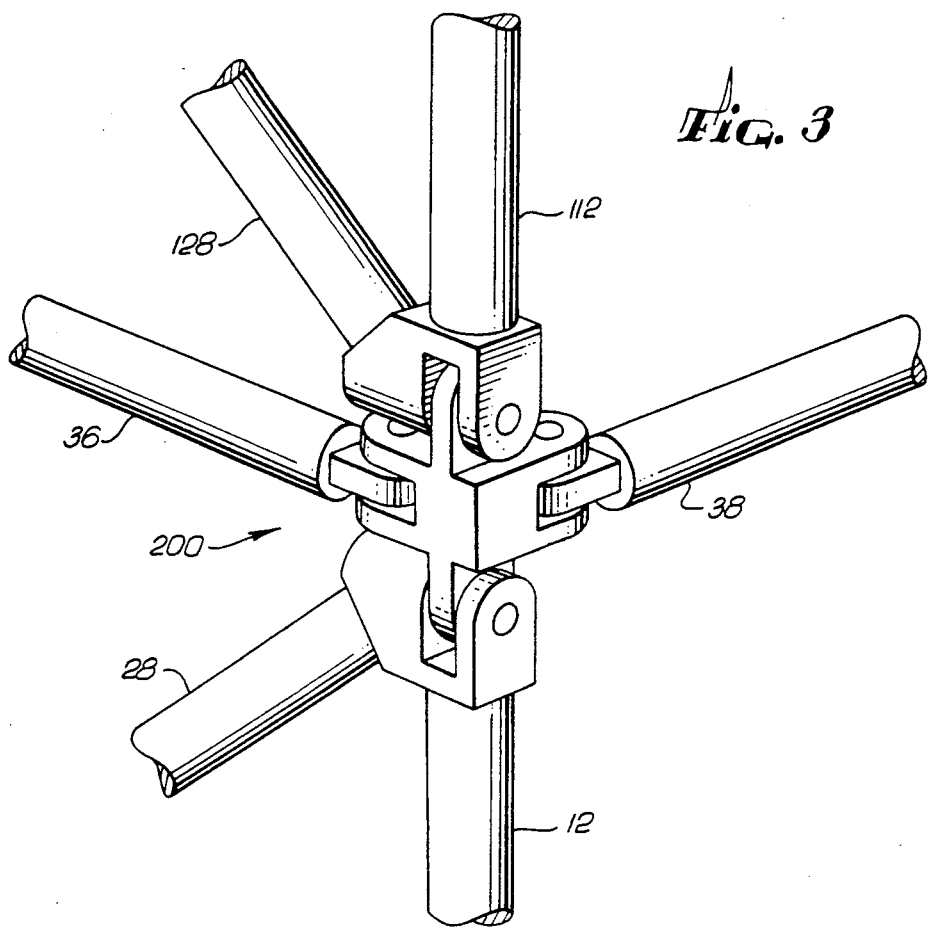
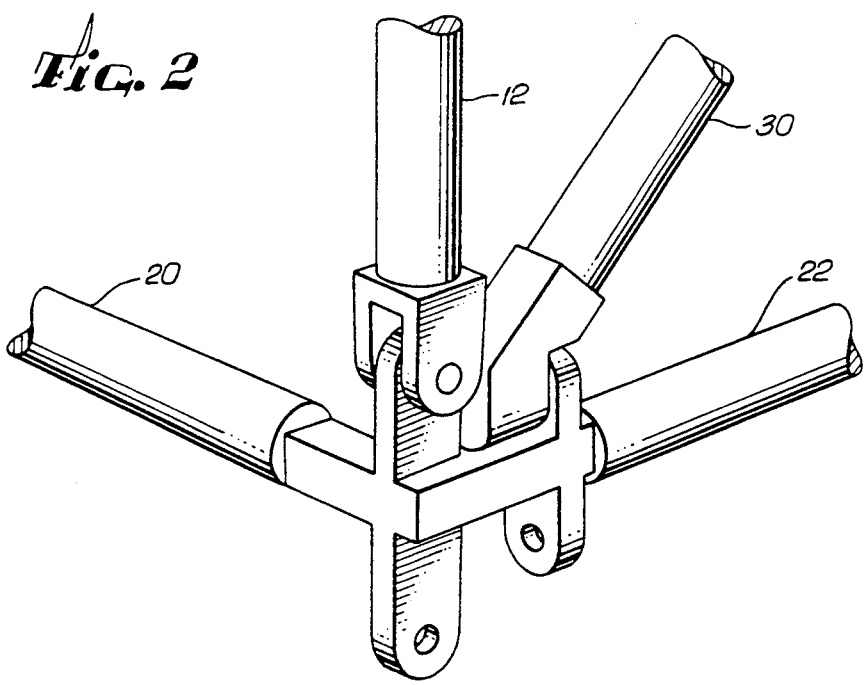

COLLAPSIBLE STRUCTURE

BACKGROUND OF THE INVENTION

1. Field of the Invention

This invention relates to truss structures and, more particularly, to collapsible truss structures desirable for space applications.

2. Description of the Related Art

Truss structures are desirable in space applications because they offer high strength and/or stiffness and low mass. External loads on trusses are reacted to by the truss members in pure tension or columnar compression. Such highly directed loading allows the use of uni-directional filamentary composite tubes as members, which have very high ratios of material stiffness-to-mass. The attendant truss property of repeating symmetry makes efficient packaging possible.

The evolution of deployable space trusses has been toward greater performance in terms of high stiffness and low mass. For example, a deployable lattice column is described in U.S. Pat. No. 3,486,279 to James E. Webb. FIG. 7 thereof discloses a truss structure in which the longerons are comprised of continuous flexible rods. Thus, there are no hinges along the longerons and the full length of the longeron is utilized in terms of resisting collapse of the column, since the longerons maintain a tendency to spring back to a straight shape. The absence of longeron hinges results in a structure of low mass. The column, however, is limited in cross section because of strain in the packaged or collapsed condition. Hinging along the longerons would allow greater freedom in longeron member size, but hinge compliance would degrade member stiffness. Similar comments apply to U.S. Pat. No. 4,532,742 to Koryo Miura, which discloses a similar structure employing continuous, flexible rods as longerons but adds spacers 2 along the longitudinal axis of the structure.

The development of single-degree-of-freedom hinge technology has significantly reduced hinge compliance, and articulated structures have become viable. The structure disclosed in U.S. Pat. No. 4,480,415 to Peter Truss, in which the longerons are arranged to form a triangular cross-section, includes longeron members that are formed from pairs of foldable rod members. Pressure directed at a longeron along the triangular face collapses the longeron. Disclosed in FIG. 2 of the above-referenced patent to Webb is a deployable column in which the longerons do not fold, but in which the diagonals do collapse.

Although single-degree-of-freedom hinges reduce hinge compliance, such hinges also introduce a problem: in general, packaging a truss structure using such hinges involves member strain during the transition from fully deployed to fully collapsed, even though either extreme is unstrained. As a result, force is required for deployment which depends on the degree of strain, and member sizing is limited to that which can survive the strain. Thus, there is a continuing need for improvements in truss structures for space applications that overcome the problems mentioned above.

SUMMARY OF THE INVENTION

The present invention overcomes the above problems, and others, by providing a structural unit in which the longerons do not fold, the diagonals do not fold, and there is no deployment strain on the members. The non-folding longerons and diagonals minimize the number of hinges required so that compliance, as well as weight, is reduced. The lack of deployment strain allows the use of members of any stiffness and size.

Strain that occurs during articulation of a hinged structure arises because of one or both of the following effects: (a) two hinges, which are associated because an articulating member connects them, change in angular orientation with respect to each other; (b) one of the two associated hinges moves along the axis of the other. In other words, the respective planes in which two hinges rotate change in terms of relative angle, or one hinge moves along the axis of the other, notwithstanding the presence of a connecting rod member. In the present invention, neither of these phenomena occur; that is, hinges which are associated do not change with respect to each other in position or orientation.

The present invention may be used to construct a truss structure especially suited to space applications. The basic "building block" of the present invention consists of three rigid members that form a frame unit in the shape of a right triangle, the members being a longeron, a diagonal, and a batten. This frame unit does not change shape during packaging or during the transition from stowed to deployed condition and is connected to other identical frames by connecting the rigid batten members end-to-end in a in a quadrelateral. The batten members so connected form a planar surface. The longeron and diagonal members are connected to their associated batten by hinges and pivot about an axis parallel to the batten member.

An additional frame member is a folding or buckling batten, which completes the structure. The folding or buckling batten is hinged at its midpoint and is connected at one end to the corner of the frame where the longeron and diagonal meet and at the other end is connected to a neighboring frame unit (that is, another longeron-diagonal joint). In this way, the folding batten members combine with the longeron, diagonal, and rigid batten members in the deployed state to form a quadrilateral face of the structure. The folding batten members pivot about their mid-point hinges during the transition between the deployed condition and collapsed condition. The hinges at the mid-point of the folding batten rotate about an axis parallel to the deployed truss structure longitudinal aixs, perpendicular to the plane formed by the rigid batten members. During the transition between the stowed and deployed conditions, the folding batten axis of rotation remains perpendicular to the rigid batten plane, in keeping with the lack of longeron and diagonal strain characteristic of the present invention.

A truss beam structure may be assembled using a plurality of such structural units connected together such that the longerons extend along the longitudinal axis of the beam structure, while the battens extend perpendicular to the longerons and the diagonals brace the longerons and battens. Thus, the present invention discloses a structure in which the load-carrying members (longerons and diagonals) do not fold, but yet may be stowed into a compact package. Additionally, deployment does not cause member strain, allowing more freedom in choosing member size and composition and providing a rigid, low-mass structure.

The present invention is able to combine rigid structural elements with the articulation necessary to compactly collapse the structure through the use of the unique hinge clusters provided, which allow the structure to collapse into a compact size and still utilize members that do not fold. The hinge clusters include corner joints and frame member end pieces that allow the various frame members to meet at the desired angles and still rotate between collapsed and deployed conditions with a single degree of freedom.

The novel features that are believed to be characteristic of the present invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1(a)–1(e) show a perspective view of a column structure in accordance with a preferred embodiment of the present invention form a fully deployed state through mid-deployment stages to a fully collapsed state.

FIG. 2 shows a perspective view of a base hinge cluster used to various structural members.

FIG. 3 a perspective view of a mid-structure hinge cluster used to join various structural member.

DETAILED DESCRIPTION OF THE PREFERRED EMBODIMENT

Figure 1D:
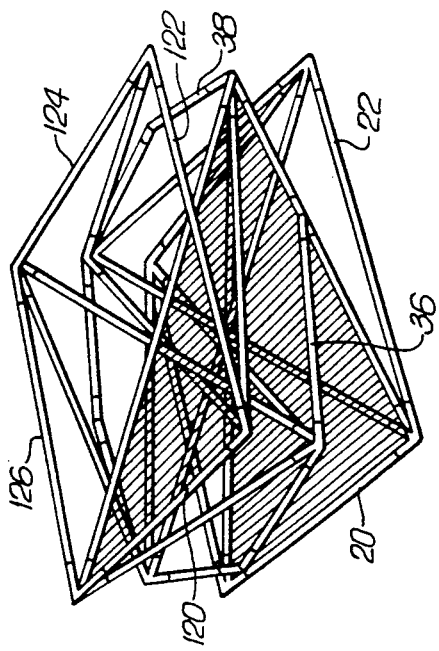
Figure 1E:
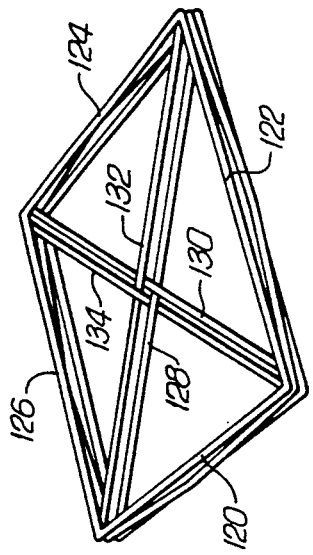
Figure 1C:
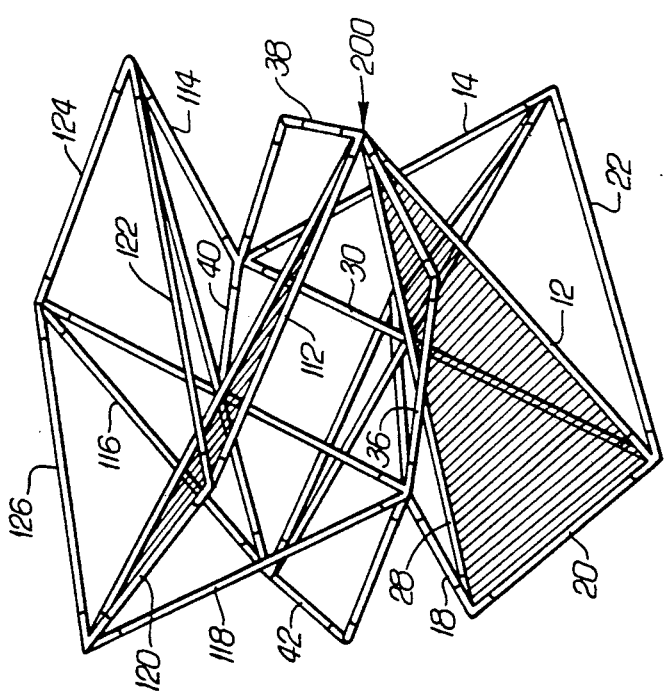

FIGS. 1(a) –1(e) show a deployable truss structure constructed in accordance with the present invention comprised of two frame sections 101 and 102. FIG. 1(a) shows the beam structure in its fully deployed state, while FIGS. 1(b)–1(d) show the structure through mid-deployment stages to a fully collapsed state shown in FIG. 1(e). The two sections 101 and 102 are mirror images of each other; section 101 will be described in detail. The section 101 has a quadrilateral cross section and has four longerons 12, 14, 16, and 18 extending along its longitudinal axis. The longerons define four faces of the section 101. Longerons 12 and 18 are connected to either end of a batten member 20. The other longerons are similarly connected with batten members 22, 24, and 26, all of which are perpendicular to the longeron members. A diagonal member 28 braces longeron member 12 and batten member 20 by extending between the ends of the longeron 12 and batten 20 that are not joined to each other. Similarly, diagonal member 30 extends between longeron member 14 and batten member 22, diagonal member 32 extends between longeron 16 and batten 24, and diagonal 34 extends between longeron 18 and batten 26. Thus, each face of the section 101 is bisected by a diagonal. FIGS. 1(a)–1(e) show one such face partially shaded to aid in visualizing the stages of deployment.

Completing the frame section are four folding batten members 36, 38, 40, and 42, extending between the longeron members and located on each quadrilateral face opposite batten members 20, 22, 24, and 26, respectively. The structure defined thus far is the smallest structural unit that may be used to construct a column in accordance with the preferred embodiment of the present invention. FIG. 1a shows a short column constructed of two structural units 101, 102. It is readily apparent that more than two such units 101, 102 could be used to construct a longer beam structure. Thus, longeron 12 is followed along the longitudinal axis of the structure by longeron member 112. Likewise, longeron member 14 is associated with longeron member 114, longeron member 16 is associated with longeron member 116, and longeron member 18 is associated with longeron member 118. Furthermore, the longeron members 112, 114, 116 and 118 are joined together by batten members 120, 122, 124, and 126, respectively. The two structural units 101, 102 "share" folding batten members 36, 38, 40, and 42. In the preferred embodiment, the diagonal members of one structural unit are located as "mirror images" of diagonal members of an associated structural unit. Thus, diagonal member 128 is located on the same quadrilateral face as diagonal member 28, and is joined at the folding batten member 36 at the same end as diagonal member 28. Likewise, diagonal member 130 is associated with diagonal member 30, diagonal member 132 is associated with diagonal member 32, and diagonal member 134 is associated with diagonal member 34. Other structural units could be added onto the structure 10 in order to create a columnar structure of much greater extent than that illustrated.

FIG. 2 shows a base hinge cluster that is used at the corners of the structure where the rigid batten members meet diagonal and longeron members. FIG. 2 shows that joined to the base hinge cluster are two batten members 20 and 22, a longeron member 12, and a diagonal member 30. FIG. 2 also shows that the batten members 20 and 22 meet at a right angle, defining a batten plane, while the longeron 12 extends perpendicular to the batten members and rotates in a plane perpendicular to the batten plane. FIG. 1 and FIG. 2 show that the diagonal 30 is joined to the base hinge cluster at an angle and rotates about an axis parallel to the batten plane. The hinge cluster includes a corner joint, which is provided with a plurality of flat projections. The ends of the longerons and diagonals are hinged with the flat projections. Each of the flat projections has a hole, as does the end of the frame member to be joined. The holes in the corner joint and the end of the frame member are aligned and a pin is inserted through the hole. In this way, the respective frame members are free to rotate relative to the corner joint in the desired manner. Each of the hinge clusters used in the present invention is configured so as to allow a single degree of freedom during rotation. For example, the diagonals rotate about an axis parallel to the plane defined by the batten members, while their longitudinal axis is inclined to the rotational axis. Therefore, the diagonal end that is hinged with the corner joint is provided with a dog-leg bend, as shown in FIG. 2 and FIG. 3. The rigid batten member is also joined to the corner joint, adjacent the flat projections. As illustrated in FIG. 2, the base hinge cluster only allows the longeron and diagonal member to rotate. The rigid batten members 20 and 22 are fixed in position and do not rotate.

FIG. 3 shows a mid-structure hinge cluster at which longerons, diagonals, and folding batten members are joined. This hinge cluster is constructed similarly to the hinge cluster of FIG. 2, except that all frame members joined by the mid-structure hinge cluster rotate relative to the hinge cluster. Once again, all rotation is through a single degree of freedom.

FIG. 3 shows a hinge joint 200 at which six members are pivotally connected. Joint 200 connects longeron members 12 and 112 to each other, joins folding batten members 36 and 38 together (forming a corner of the structure) and also connects associated diagonal members 28 and 128. FIG. 3 shows that the batten members 36 and 38 meet at a right angle, defining a batten plane, while the longeron members 12 and 112 extend perpendicular to the batten plane and rotate in a plane perpendicular to the batten plane, and the diagonals 28 and 128 each pivot about an axis parallel to the batten plane. During the transition from the deployed state to the collapsed state of the column structure, folding batten members 36 and 38 will hinge outward at their midpoint hinges, away from the column structure, longeron members 12, 112 will pivot toward each other as illustrated in FIG. 1(b), and diagonal members 28 and 128 will follow accordingly.

Figure 4A:
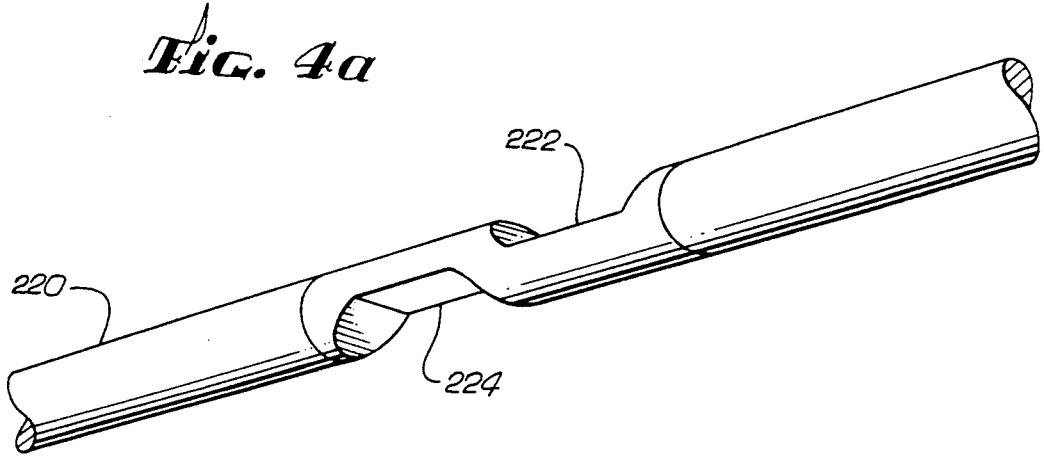
FIGS. 4(a) and 4(b) show further detail of the diagonal members of FIG. 1(a).
Figure 4B:
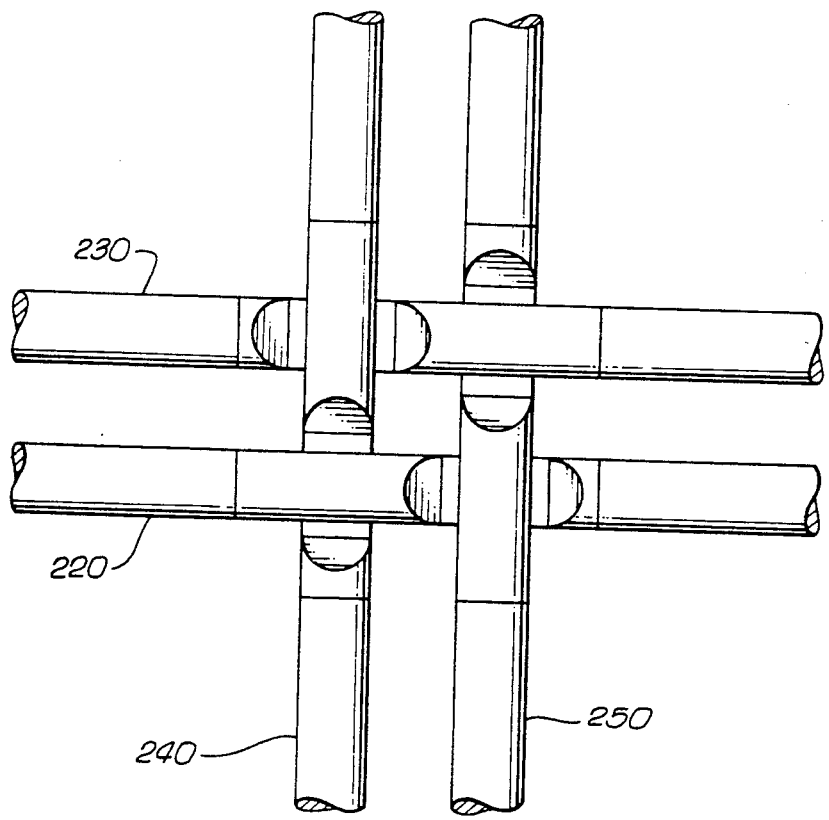

FIG. 4(a) shows a detail of a diagonal member 220 illustrating the configuration at the midpoint of the diagonal member with cut-out or trough portions 222 and 224 located on opposite sides of the diagonal member. This configuration is necessary because, upon collapsing the structure 10, the diagonal members will come to rest in a substantially coplanar fashion. When a diagonal member 220 is laid on top of a similar diagonal member and perpendicular thereto with the trough portions facing each other, the two diagonal members will be substantially coplanar. In this way, diagonal member 220 can cross two other similar diagonal members in a perpendicular manner while still lying coplanar therewith. Thus, four similar diagonal members can cross perpendicularly to each other while lying flat. FIG. 4(b) illustrates an arrangement of four diagonal members 220, 230, 240, 250 resting in interleaved, substantially coplanar fashion following collapse of the structure.

Although a particular embodiment of the present invention has been described and illustrated herein, modifications and variations may be readily apparent to those skilled in the art. For example, although the batten members and longerons are shown as being of equal length, such a configuration is not a requirement of the invention. It is also contemplated that certain durable, high strength materials may be used in producing a truss structure in accordance with the present invention. For example, the hinges and joints may be constructed of stainless steel, and the frame members may be constructed of graphite epoxy composite tubing. Accordingly, the scope of the present invention should be considered in terms of the following claims, which are not to be limited to the details of the embodiment described and illustrated herein.

What is claimed is:

1. A truss structure movable between a collapsed position and a deployed position having:
    at least one frame section, each frame section comprising four rigid, elongate batten, longeron, and diagonal members, and four folding batten members,
    the rigid batten members each having first and second ends, the first and second ends of the rigid batten members being connected so that the rigid batten members form a quadrilateral,
    each longeron having a first end and second end, the first end of each longeron being pivotally connected to the first end of an associated rigid batten member at each corner of the quadrilateral such that each longeron pivots about an axis parallel to the longitudinal axis of the associated rigid batten member and such that, in the deployed position, each longeron is perpendicular to the plane defined by the quadrilateral,
    each diagonal being connected to the second end of an associated longeron, and to the second end of the rigid batten member associated with said associated longeron, each diagonal being pivotally connected at the right batten member such that the diagonal rotates about the same axis as the axis about which the longeron pivots, and having two trough portions located opposite and adjacent to each other at approximately the midpoint of the diagonal;
    the midpoint of each folding batten member being hinged about an axis perpendicular to the face of the quadrilateral and the ends of the folding batten members being pivotally connected to the junction of a diagonal and longeron such that the folding batten members pivot during the transition between collapsed and deployed positions of the truss structure.

2. A truss structure movable between a collapsed position and a deployed position, having:
    at least one structural unit comprising four frame units, each frame unit comprised of first, second and third elongate members forming a right triangle, the first elongate member of each frame unit being connected to the first elongate member of another frame unit so that the connected first elongate members form a rigid quadrilateral, the remaining second and third elongate members of each frame unit being pivotally connected to the first elongate member so as to pivot about an axis parallel to the longitudinal axis of the first elongate member, the third elongate member defining the hypotenuse of the right triangle of each frame unit, the hypotenuse having two trough portions located opposite and adjacent each other at the midpoint of the hypotenuse longitudinal axis; and
    at least four folding batten members, hinged at their midpoints about an axis perpendicular to their longitudinal axis and pivotally connected at their ends to the frame units such that the frame units pivot toward the interior of the quadrilateral so as to move between the deployed position, in which the frame units are perpendicular to the plane defined by the quadrilateral, and the collapsed position, in which the frame units lie in a plane parallel to the quadrilateral.

3. The truss structure of claim 2, wherein the frame members are pivotally connected by hinges and the hinges are constructed as single-degree-of-freedom hinges that are limited to movement in a single plane.

4. The truss structure of claim 2 wherein the batten members and first and second elongate members are of equal length.

5. The truss structure of claim 2 wherein the elongate members are constructed of graphite/epoxy tubes.

6. The truss structure of claim 2, further comprising a joint joining two batten members, a second elongate member, and a third elongate member; wherein the second elongate member and the third elongate member are joined to the joint by single degree of freedom hinges such that the second elongate member pivots in a plane perpendicular to the plane defined by the batten members and the third elongate member pivots about an axis parallel to the plane defined by the batten members.

7. The truss structure of claim 2, wherein two batten members, two second elongate members, and two third elongate members are joined to the joint by single degree of freedom hinges such that the second elongate members pivot in a plane perpendicular to the plane defined by the batten members and each third elongate member pivots about an axis parallel to the plane defined by the batten members.

8. The truss structure of claim 2, further comprising a joint having first, second and third hinges joining two first elongate members, a second elongate member and a third elongate member, wherein the second and third elongate members are joined rigidly together and pivot at the joint about the first hinge which is parallel to the second and third hinges in the frame, and the second and third elongate members pivot about hinges perpendicular to the plane defined by the quadrilateral formed by the first elongate members.

9. The truss structure of claim 2, further comprising a joint, wherein two first elongate members, two second elongate members and two third elongate members are joined to the joint by single degree of freedom hinges such that each second-third elongate member pair pivots abut a hinge parallel to others in the associated frame and the second and third elongate members pivot about hinges perpendicular to the plane defined by the quadrilateral formed by the first elongate members.

10. A truss structure movable between a collapsed position and a deployed position, having:
at least one frame section comprised of a plurality of frame units, each frame unit comprised of three elongated members forming a triangle independent of the elongated members of the other frame units, a first member of each frame unit being coupled to a first member of another frame unit so that the coupled first members form a polygon, the remaining members of each frame unit being pivotally connected to the first member of the frame unit; and
a plurality of folding batten members foldable approximately at their midpoints and pivotally coupled at their ends to the frame units to form a second polygon.

11. The structure of claim 8 wherein the folding battens are hinged approximately at their midpoints.

12. The structure of claim 8 wherein the folding battens are adapted to buckle approximately at their midpoints.

13. A truss structure movable between a collapsed position and a deployed position having:
at least one frame section, each frame section comprising a plurality of rigid, elongate batten, longeron, and diagonal members, and a plurality of folding batten members,
the rigid batten members each having first and second ends and the rigid batten members being connected at their ends so as to form a polygon,
each longeron having a first end and second end, each longeron being pivotally connected at a first end to a first end of an associated rigid batten member at each corner of the polygon such that each longeron pivots about an axis parallel to the longitudinal axis of the associated rigid batten member and such that, in the deployed position, each longeron is perpendicular to the plane defined by the polygon,
each diagonal being connected to the second end of an associated longeron, and to the second end of the rigid batten member associated with said associated longeron, each diagonal being pivotally connected at the rigid batten member such that the diagonal rotates about the same axis as the longeron, and having two trough portions located opposite and adjacent to each other at approximately the midpoint of the diagonal;
the folding batten members being hinged at their midpoint about an axis perpendicular to the face of the polygon and pivotally connected at their ends to the function of a diagonal and longeron such that the folding batten members pivot during the transition between collapsed and deployed positions of the truss structure.

14. A truss structure movable between a collapsed position and a deployed position, having:
at least one structural unit comprising a plurality of frame units, each frame unit comprised of first, second and third elongate members forming a right triangle, the first elongate member of each frame unit being connected to the first elongate member of another frame unit so that the connected first elongate members form a rigid polygon, the remaining second and third elongate members of each frame unit being pivotally connected to the first elongated member so as to pivot about an axis parallel to the longitudinal axis of the first elongate member, the third elongate member defining the hypotenuse of the right triangle of each frame unit, the hypotenuse having two trough portions located opposite and adjacent each other a the midpoint of the hypotenuse longitudinal axis; and
a plurality of folding batten members, hinged at their midpoints about an axis perpendicular to their longitudinal axis and pivotally connected at their ends to the frame units such that the frame units pivot toward the interior of the polygon so as to move between the deployed position, in which the frame units are perpendicular to the plane defined by the polygon, and the collapsed position, in which the frame units lie in a plane parallel to the polygon.

15. The truss structure of claim 4 wherein the frame member are pivotally connected by hinges and the hinges are constructed as single-degree-of-freedom hinges that are limited to movement in a single plane.

16. The truss structure of claim 14 wherein the batten members and the first and second elongate members are of equal length.

17. The truss structure of claim 14 wherein the elongate members are constructed of graphite/epoxy tubes.

* * * * *